Feb. 19, 1935.  P. M. BOURDON  1,992,117
VEHICLE BRAKE
Filed Nov. 29, 1933   3 Sheets-Sheet 1

Inventor
Pierre Marcel Bourdon
By
Wilkinson & Mawhinney
Attorneys.

Patented Feb. 19, 1935

1,992,117

UNITED STATES PATENT OFFICE 1,992,117

VEHICLE BRAKE

Pierre Marcel Bourdon, Paris, France, assignor to Michelin et Cie., Clermont-Ferrand, France, a corporation of France Application November 29, 1933, Serial No. 700,310
In France December 6, 1932

5 Claims. (Cl. 188—79.5)

The present invention relates to improvements in vehicle brakes, and relates more particularly to that type of brake in which a cam expands brake shoes to force same against the inner surface of the brake drum.

The improvement has for an object to obtain an automatic take up of all the play which is produced either accidentally or by reason of wear, between the shoes and the drum, whereby to obtain constantly good braking by the rotating of the cam through a very small angle, which angle will be at all times constant; the same rotation of the cam throughout the same small angular distance providing for the release of the brake.

By the use of the present invention there is secured at all times a constant stroke in length and position or movement of the brake pedal or other control device irrespective of the progressive wear of the shoe or brake lining carried thereby.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a sectional view, with parts shown in elevation, taken through a conventional brake structure showing the improvements applied thereto.

Figure 1:
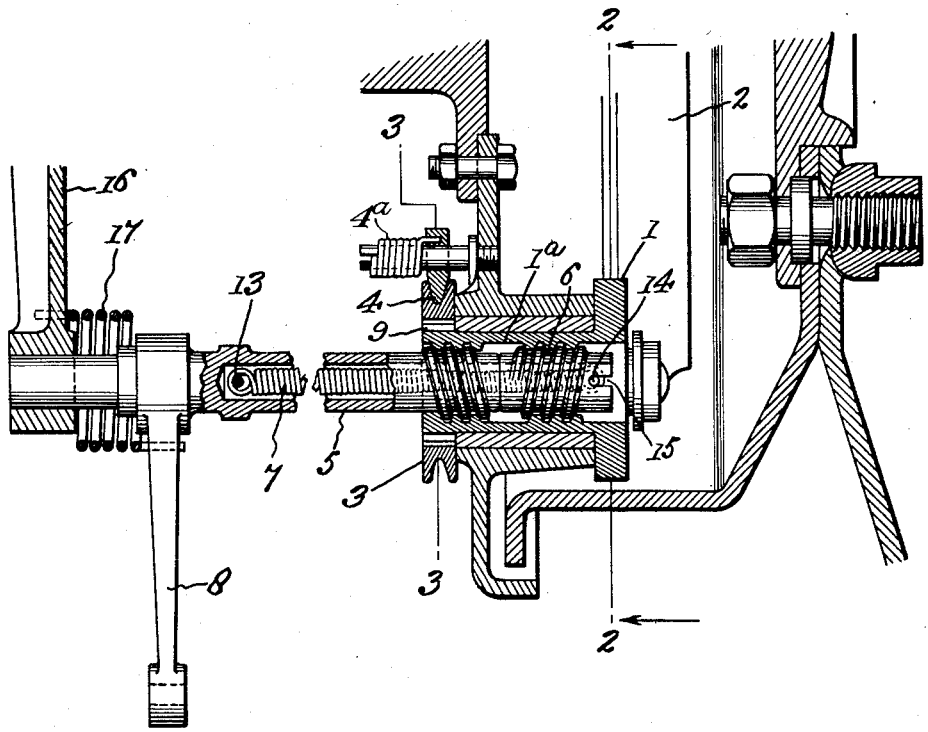

Referring more particularly to the drawings 1 represents a cam and its sleeve. This cam expands the brake shoes 2 in the usual way. The cam may be an S-shaped cam, the shape being determined so as to give space to the shoes proportional to the angle of rotation of the cam. The cam sleeve or extension 1ª is provided with teeth 9, clearly shown in Figures 3 and 4. These teeth 9 fit into the notches 10 between teeth 11 of a ring 3. The ring 3 is arranged to rotate in one direction, namely a clockwise direction as viewed in Figures 3 and 4 but is non-rotative in the opposite direction. The rotation of the ring 3 is effected by means of the engagement of the teeth 9 and 11. Between such teeth there is a certain annular play indicated by the angle J. This angular distance J will correspond with the angular distance through which the cam turns when normally applying the brakes. The ring 3 may be locked against rotation in a counter-clockwise direction in any appropriate manner whereby it does not turn in the direction of releasing of the brakes.

In the example shown the ring 3 at its outer periphery is grooved, as illustrated in Figure 1, and in such groove is engaged one or more spring pawls or dogs 4 constantly urged to engaging position by springs 4a. Of course a band brake or any appropriate frictional element might be substituted for these pawls.

Into the cam 1 or its sleeve 1ª is screwed an arm or shaft 5, the direction of screwing such shaft into the cam being the direction of braking movement.

In the arrangement shown in Figure 1, the shaft 5 is screwed by means of a right hand thread into the cam sleeve 1ª, such sleeve forming in effect a nut. A second screw 6 of opposed pitch with reference to the first mentioned screw, namely a left hand screw, is run into the cam sleeve 1ª and abuts against the end of the shaft 5. The shaft 5 is preferably hollow and contains a spring 7 anchored as at 13 and extending through the hollow screw 6 to which it is secured by a cross pin 14 engaging in a slot 15 of the screw 6. Under the circumstances, if the screw 5 is turned to the right, that is to say in the direction of braking, such screw would tend to rotate in the cam sleeve 1ª, but as it abuts against the screw 6, which is left handed, screwing of the shaft 5 relatively to the cam sleeve 1ª is impossible, and so the cam is thereby driven in a positive manner to spread the brake shoes and apply the brakes. It will be understood that as the screw 5 is rotated, by reason of its abutment against the screw 6, it will tend to rotate such screw 6; but inasmuch as the thread of screw 6 is of the opposite pitch there will only occur a stronger binding engagement between the screws 5 and 6 and the cam sleeve 1ª; and, of course, the screw 6 cannot be backed off toward the right, as shown in Figure 1, by a right hand rotation of the screw shaft 5.

The shaft or arm 5 is rotated or partially turned by means of a lever 8 and the shaft 5 is mounted for axially sliding movement in a bearing 16. Associated with the arm 8 is a coil spring 17 adapted, in a manner quite well known in this art, to restore the lever back against a stop to initial position after each application of the brakes. To the lever 8 is connected any suitable controlling device, usually a brake pedal.

Figure 2:
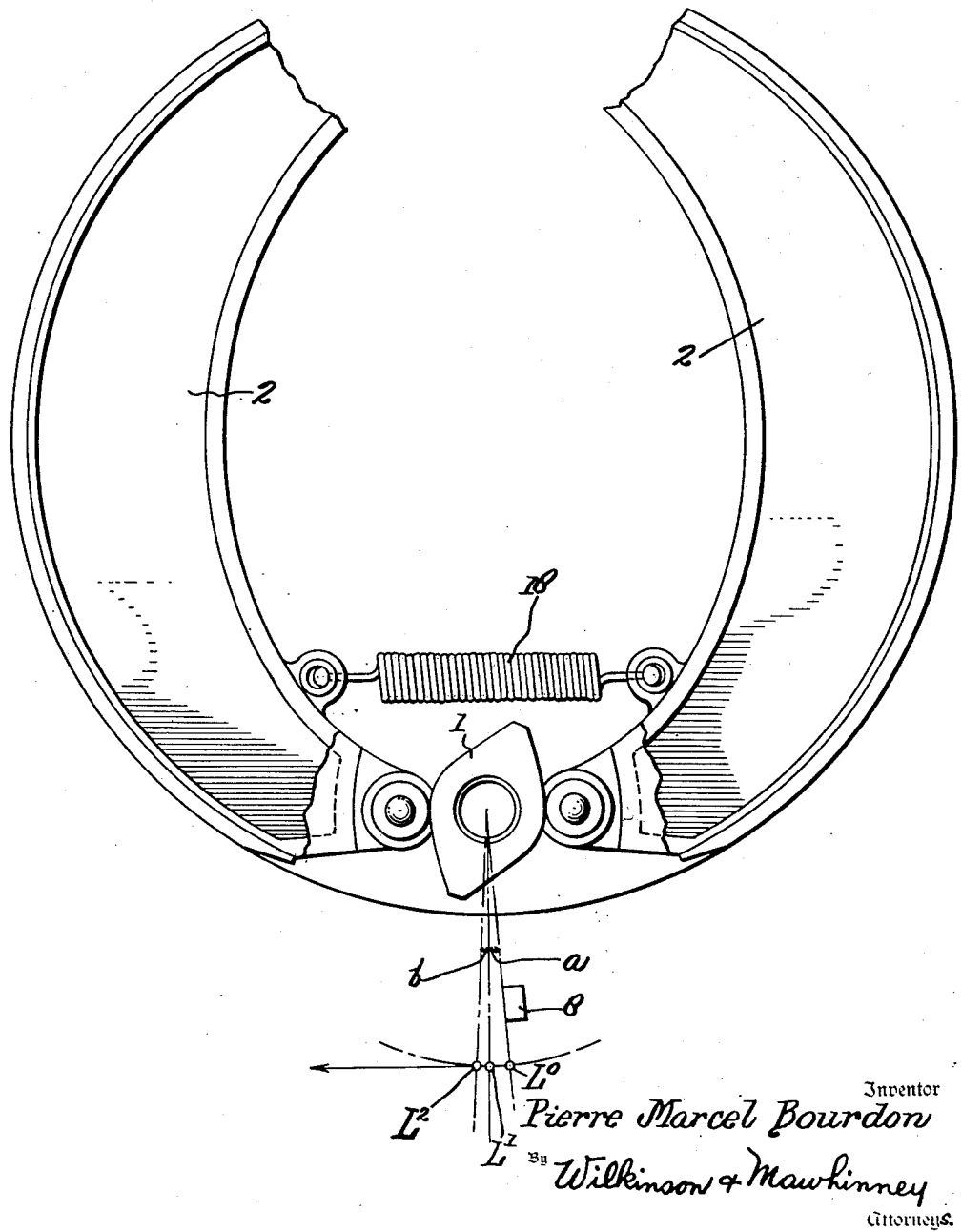
Figure 2 is a cross section taken on the line 2—2 in Figure 1 and showing the interior of the drum the shoes and the cam.

Referring to Figure 2, L₀ shows the position of the lever 8 when the brake is in the off or released position. The teeth 9 and 11 are at this time in the position illustrated in Figure 4, so that there is a space J between the teeth with respect to a forward clockwise movement of the cam sleeve 1ª. In order to apply the brakes the lever 8 is moved to the position shown at L₁ in Figure 2. In other words the lever 8 is moved through the angle alpha. This angle alpha is equal to the angle J, shown in Figures 3 and 4. Therefore when the brake lever 8 is moved through its normal angular distance for applying the brakes, when in new and good condition, the cam sleeve 1ª will have advanced a distance to bring the teeth 9 to the position shown in Figure 3. In other words the amount of play will be taken up between the cam sleeve and the ring 3 by this normal braking movement. When the brakes are released the spring 17 will restore the lever 8 and shaft 5 to the initial position L₀ and the cam sleeve 1ª will be restored by the spring 18, shown in Figure 2, to its initial position while the teeth 9 will return to the position shown in Figure 4.

Figure 3:
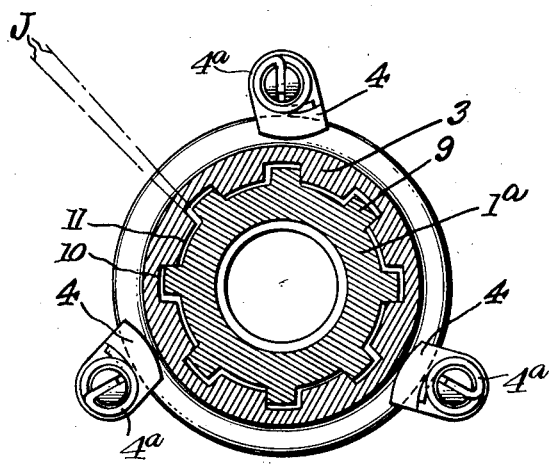
Figure 3 is a cross section taken on the line 3—3 of Figure 1 showing one position of the cam and ring.
Figure 4:
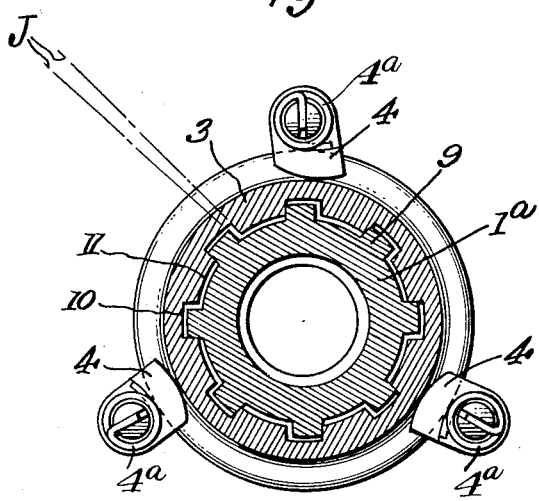
Figure 4 is a similar view showing a different position of the cam and ring.

When the brake has been applied as previously explained and the parts are in the position shown in Figure 3, all of the play J has been taken up between the teeth 9 and 11. At this time the brake shoes 2 are in contact with the brake drum and the lever 8 is in the position L₁. The braking effect at this time is at its maximum. If, because of wear of braking lining, drum wear or brake shoe wear, the lever 8 must be continued to be moved over to the position noted at L₂ in Figure 2, then the lever has moved through an angle beta, which angle plus the angle alpha is larger than the angular space J, shown in Figures 3 and 4. The teeth 9 therefore will drive the ring 3 through an angular clockwise distance corresponding to the angle beta.

When the brake mechanism is released, the ring 3 may not rotate back to its original position because such ring is bound by the pawls 4. The spring, however, will promptly restore the lever 8 to its original position L₀ and the shaft 5 will be rotated and shifted axially with respect to the cam sleeve 1ª accordingly. However the cam and cam sleeve 1ª will not be permitted to rotate back to original position because of the advanced movement of the ring 3 which will limit the counter-clockwise return rotary movement of the cam sleeve 1ª by reason of the teeth 9 abutting against the teeth 11.

As the shaft 5 is screwed out of the sleeve 1ª on the return movement of the brake lever 8 to the position L₀ through the angle beta, the reverse screw 6 will be moved along by the spring 7 to the left due to the high pitch of the left hand threads on the screw 6 and the fact that initially the spring 7 is placed under the desired tension to effect turning of the screw 6 when loosened by reason of the unscrewing of the oppositely pitched threads on the shaft 5, as viewed in Figure 1, thereby following up the shaft 5. Consequently when the brake lever 8 is again operated it will cause binding engagement of the brake shoes through the same angular movement L₀ L₁.

Due to this arrangement, the position L₁ of the lever 8, which corresponds to the contact position of the brake shoes with the brake drum, is always constant, without regard to the wear between the shoes and drum.

On the contrary, the angular position of the cam 1 will vary progressively as wear takes place. It is apparent that the cam may be so calculated that when the brake lining is all worn away, the off or release position of the cam will be its position of maximum expansion of the brake shoes. In other words with this arrangement it will be impracticable to apply the brakes and consequently to injure or score the drums or the shoes.

As wear continues to take place the ring 3 will be advanced step by step around through small progressive angular distances and this ring will therefore prevent the cam and its sleeve from returning as far back toward initial position as it did before.

Therefore the cam will be progressively caused to assume new angular positions of rest with respect to the brake shoes until the maximum point of wear occurs as above described whereupon the lobes of the cam will be directly between the brake shoes. During all of this time the screw 6 will be constrained to follow up against the shaft 5 and thus provide the necessary abutment for the shaft 5 to bind against in creating a binding engagement between the shaft 5 and the cam sleeve 1ª. Therefore the brake lever 8 may constantly return to the same initial position L₀ and the brakes will be self-adjusting.

It is to be understood that the invention is not limited to the example shown in the drawings but that such drawings illustrate only one embodiment of which the invention is susceptible and I reserve the right to make all such modifications as are within the scope of the following claims.

What is claimed is:—

1. A device for the automatic take-up of play between the shoes and the drum of brakes in which a cam operates the shoes, comprising a ring rotatable in one direction only and having means to act as a stop for the return movement of the cam, said ring and cam means having a play therebetween corresponding to the normal stroke of braking, an operating means threadedly coupled to the cam and biased to the same initial position, and follower means on the cam movable to constitute a constant abutment for the operating means.

2. A device for the automatic take-up of play between the shoes and the drum of brakes in which a cam operates the shoes, comprising a ring rotatable in one direction only and having means to act as a stop for the return movement of the cam, said ring and cam means having a play therebetween corresponding to the normal stroke of braking, a screw operating means threadedly coupled to the cam and biased to the same initial position, a screw follower threadedly coupled to the cam, and means to urge said follower against said operating means.

3. A device for the automatic take-up of play between the shoes and the drum of brakes in which a cam operates the shoes, comprising a ring rotatable in one direction only and having means to act as a stop for the return movement of the cam, said ring and cam means having a play therebetween corresponding to the normal stroke of braking, a screw operating means threaded in the cam, means tending to restore said operating means to the same initial position, a screw follower threaded in the cam and having a pitch thread opposite to that of the operating means, and a spring device for urging said follower constantly against the operating means.

4. In a vehicle brake having a drum, brake shoes and a cam, a cam sleeve on the cam having interiorly two threads of opposite pitch and exterior teeth, a rotatable ring having teeth with spaces wider than the cam teeth and receiving such cam teeth, means to prevent rotation of the ring in a brake-releasing direction, an operating shaft threaded in one set of the cam threads, a follower screw threaded in the other opposite set of threads of the cam, and yieldable means urging said follower screw against said operating shaft.

5. In a vehicle brake having a drum and brake shoes, a hollow cam having two sets of threads of different pitch therein, an operating shaft having threads to mate with one set of the cam threads, a follower screw having threads to mate with the other set of threads in the cam, means to urge the follower screw constantly against the operating shaft, and one-way movable means loosely associated with said cam and movable thereby for acting as a stop to limit the return movement of the cam after the braking operation.

PIERRE MARCEL BOURDON.